(12) United States Patent
Jacobson et al.

(10) Patent No.: US 7,991,973 B2
(45) Date of Patent: Aug. 2, 2011

(54) DATA STORAGE SYSTEMS, METHODS AND NETWORKS HAVING A SNAPSHOT EFFICIENT BLOCK MAP

(75) Inventors: Joel Jacobson, San Mateo, CA (US); Garth Gibson, Pittsburgh, PA (US)

(73) Assignee: Panasas, Inc., Pittsburgh, PA (US)

( * ) Notice: Subject to any disclaimer, the term of this patent is extended or adjusted under 35 U.S.C. 154(b) by 554 days.

(21) Appl. No.: 12/149,583

(22) Filed: May 5, 2008

(65) Prior Publication Data

US 2009/0276593 A1 Nov. 5, 2009

(51) Int. Cl.
*G06F 12/02* (2006.01)

(52) U.S. Cl. .......................... 711/162; 707/639; 707/649

(58) Field of Classification Search .......................... None
See application file for complete search history.

(56) References Cited

U.S. PATENT DOCUMENTS

| | | | |
|---|---|---|---|
| 6,636,879 B1* | 10/2003 | Doucette et al. | 707/690 |
| 6,651,075 B1* | 11/2003 | Kusters et al. | 1/1 |
| 6,985,995 B2 | 1/2006 | Holland et al. | |
| 7,007,047 B2 | 2/2006 | Zelenka et al. | |
| 7,386,546 B1* | 6/2008 | Santry et al. | 1/1 |
| 2005/0144501 A1* | 6/2005 | Kim et al. | 714/2 |
| 2005/0240635 A1* | 10/2005 | Kapoor et al. | 707/200 |
| 2006/0036655 A1* | 2/2006 | Lastovica, Jr. | 707/203 |
| 2006/0047926 A1* | 3/2006 | Zheng | 711/162 |
| 2009/0037418 A1* | 2/2009 | Xu et al. | 707/8 |

* cited by examiner

*Primary Examiner* — Kaushikkumar Patel
(74) *Attorney, Agent, or Firm* — Morgan, Lewis & Bockius LLP (57) ABSTRACT

A data storage system includes a storage device divided into a plurality of blocks for storing data for a plurality of volumes, and a processor to execute instructions for maintaining a block map corresponding to the data stored on the storage device. The storage system may be part of a storage system network. The block map stores reference data indicating which of the volumes reference which blocks on the storage device, and which blocks on the storage device are unallocated. The reference data may include, for groups of one or more blocks, a first value identifying the oldest volume in which the group of blocks was allocated and a second value identifying the newest volume in which the group of blocks was allocated. The volumes may include one or more snapshots.

23 Claims, 9 Drawing Sheets

DATA STORAGE SYSTEMS, METHODS AND NETWORKS HAVING A SNAPSHOT EFFICIENT BLOCK MAP

BACKGROUND

1. Field of the Invention

The present invention generally relates to data storage systems, networks, and methods that efficiently manage disk block allocation and back-up operations.

2. Description of Related Art

With increasing reliance on electronic means of data communication, different models to efficiently and economically store a large amount of data have been proposed. A data or file storage mechanism requires not only a sufficient amount of physical storage space to store data, but techniques for managing data storage. For example, file storage systems may maintain a block map to keep track of consumed and free space. Some keep a simple counter per block, while others maintain segment list data structures made up of a block number and a length of the segment.

In addition, data storage systems are provided with a level of fault tolerance or redundancy (depending on how critical the data is) to preserve data integrity in the event of one or more disk failures. Data recovery may also be needed in the event a file is accidentally deleted or corrupted. One way of providing fault tolerance is to periodically back up various directories, files, and related information stored in the data storage system to a secondary storage system, such as a tape drive or tape library, to thereby capture the file data for recovery purposes in the event that a disk failure occurs in the system. When constructing the system backup, it is useful to be able to back up a self-consistent image of the directories, files, and related information as it appears at a single point in time, without the need to halt or quiesce activity in the directories and files. One way to perform this is by constructing an image or "snapshot." A snapshot is a copy of a set of files and/or directories and related data as they are at specific point in time. A snapshot may be based on a set of files and directories or on a set of blocks on a storage device. Snapshot images are also useful for allowing recovery of accidentally deleted or corrupted files without resorting to an offline backup copy, stored for example on a tape.

Snapshots offer a fast and computationally-inexpensive backup scheme. For example, snapshots may take advantage of a copy-on-write semantic for blocks. In Unix file systems, snapshots can be implemented using inodes—data structures that contain information about the files stored in the file system—and the simple counter for the per-block structure noted above. For example, taking a snapshot in such a system involves allocating a new inode for the snapshot, pointing the inode at the same directory inode of the original volume, and incrementing the counter on which the directory inode resides. This results in the original volume and the snapshot sharing all of the data blocks allocated to the original volume, except for the top-level directory inode block.

Modifying contents of the original volume after the snapshot is taken results in propagating the incremented counter to a layer beneath it in the file system tree. When this occurs, the old contents of the block are referenced only by the snapshot, and a new block is allocated for the modification. While this scheme makes taking snapshots very fast, it requires a potentially very expensive operation to delete a snapshot, since every inode in the snapshot must be examined to determine what blocks it references, so their respective reference counts may be decremented. For example, each counter associated with the snapshot's namespace would be accessed and decremented in order to delete the snapshot. The current snapshot technique also limits the number of snapshots by the width of the counter used to track the number of references to a block. Typically, an 8-bit counter is used, thus limiting the system to roughly 250 snapshots. It is also difficult with this technique to determine how much capacity would be recovered by deleting one or more particular snapshots (i.e., how many blocks are uniquely addressed only by these snapshots), without performing a full traversal of the snapshot (equivalent to that required when deleting it), which is a lengthy operation.

SUMMARY

The present invention provides data storage systems and networks, and methods for operating data storage systems and networks, that are capable of avoiding one or more of the deficiencies described above. According to embodiments described herein, data storage systems, networks, and methods efficiently manage storage allocation and backup operations, including taking and deleting of snapshots. Further, the data storage systems and methods allow an increased number of allocated data volumes and snapshots and avoid the need for a full namespace walk when a snapshot is deleted.

Embodiments of the present invention provide data storage systems, networks, and methods that can report capacity usage on a per volume and per snapshot basis.

Embodiments of the present invention provide data storage systems, networks, and methods that enable multiple volume/snapshot creates and/or deletes in a single pass over the block map, thereby reducing the system overhead associated with certain sequences of snapshot operations. Other benefits and advantages are described herein, or are apparent from the description herein, including the drawings, or may be learned from practicing the systems, networks and methods of the present invention.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical data storage systems or networks.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment.

Figure 1:
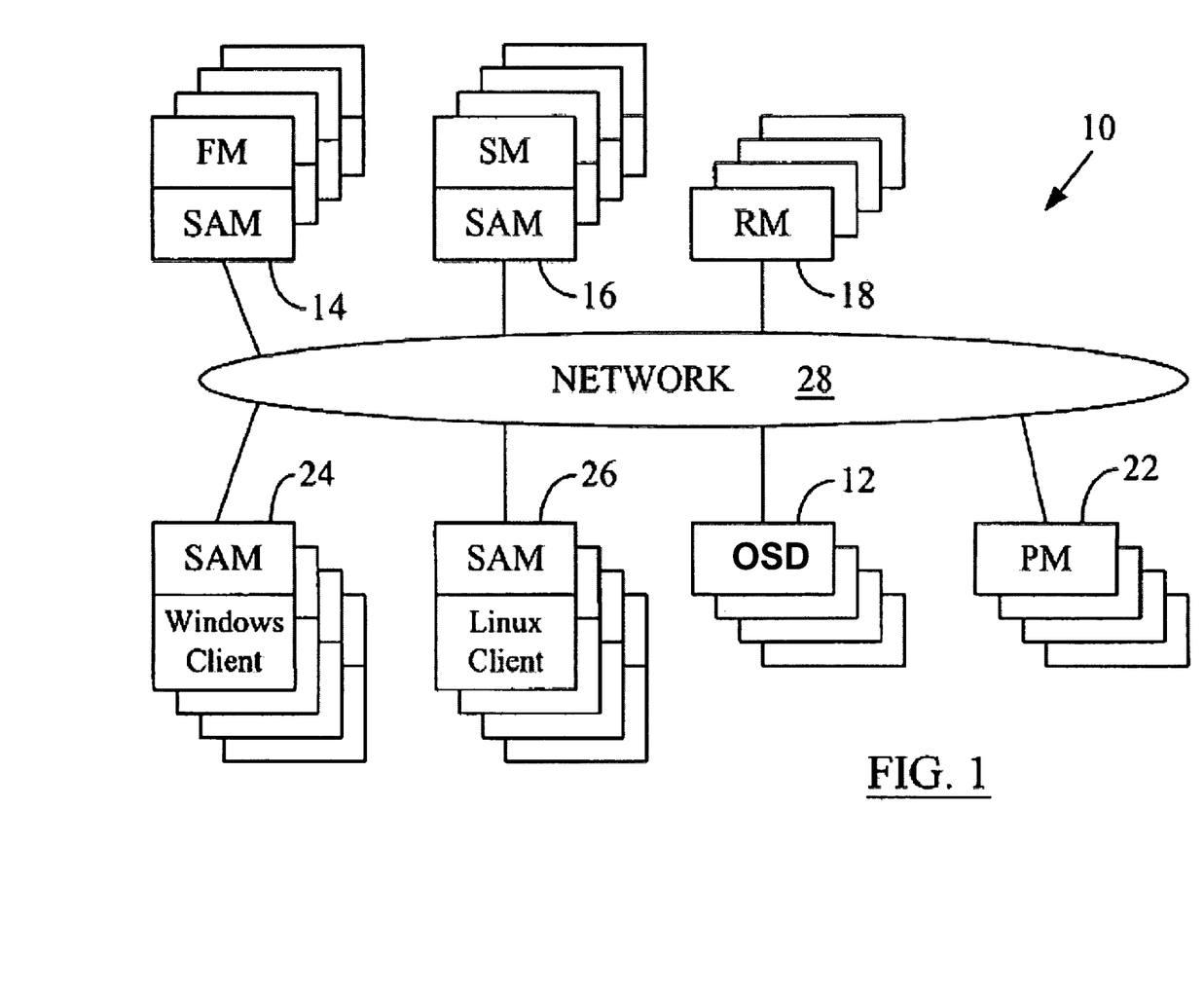
FIG. 1 illustrates an embodiment of an exemplary data storage network.

FIG. 1 illustrates an exemplary data storage network 10. It should be appreciated that data storage network 10 is intended to be illustrative structure useful for the description herein. In this embodiment, the data storage network 10 is a network-based system designed around data storage systems 12. The data storage systems 12 may be, for example, Object Based Secure Disks (OSDs or OBDs). However, this is intended to be an example. The principles described herein may be used in non-network based storage systems and/or may be used in storage systems that are not object-based, such as block-based systems or file-based systems.

The data storage network 10 is implemented via a combination of hardware and software units and generally consists of managers 14, 16, 18, and 22, data storage systems 12, and clients 24, 26. It is noted that FIG. 1 illustrates multiple clients, data storage systems, and managers operating in the network environment. However, for the ease of discussion, a single reference numeral is used to refer to such entity either individually or collectively depending on the context of reference. For example, the reference numeral "12" is used to refer to just one data storage system or multiple data storage systems depending on the context of discussion. Similarly, the reference numerals 14 and 22 for various managers are used interchangeably to also refer to respective servers for those managers. For example, the reference numeral "14" is used to interchangeably refer to the software file managers (FM) and also to their respective servers depending on the context. It is noted that each manager is an application program code or software running on a corresponding hardware, such as a server. Moreover, server functionality may be implemented with a combination of hardware and operating software. For example, each server in FIG. 1 may be a Windows NT server. Thus, the data storage network 10 in FIG. 1 may be, for example, an object-based distributed data storage network implemented in a client-server configuration.

The network 28 may be a LAN (Local Area Network), WAN (Wide Area Network), MAN (Metropolitan Area Network), SAN (Storage Area Network), wireless LAN, or any other suitable data communication network, or combination of networks. The network may be implemented, in whole or in part, using a TCP/IP (Transmission Control Protocol/Internet Protocol) based network (e.g., the Internet). A client 24, 26 may be any computer (e.g., a personal computer or a workstation) electrically attached to the network 28 and running appropriate operating system software as well as client application software designed for the network 10. FIG. 1 illustrates a group of clients or client computers 24 running on Microsoft Windows operating system, whereas another group of clients 26 are running on the Linux operating system. The clients 24, 26 thus present an operating system-integrated file system interface. The semantics of the host operating system (e.g., Windows, Linux, etc.) may preferably be maintained by the file system clients.

The manager (or server) and client portions of the program code may be written in C, C++, or in any other compiled or interpreted language suitably selected. The client and manager software modules may be designed using standard software tools including, for example, compilers, linkers, assemblers, loaders, bug tracking systems, memory debugging systems, etc.

In one embodiment, the manager software and program codes running on the clients may be designed without knowledge of a specific network topology. In such case, the software routines may be executed in any given network environment, imparting software portability and flexibility in storage system designs. However, it is noted that a given network topology may be considered to optimize the performance of the software applications running on it. This may be achieved without necessarily designing the software exclusively tailored to a particular network configuration.

FIG. 1 shows a number of data storage systems 12 attached to the network 28. The data storage systems 12 store data for a plurality of volumes. The data storage systems 12 may implement a block-based storage method, a file-based method, an object-based method, or another method. Examples of block-based methods included parallel Small Computer System Interface (SCSI) protocols, Serial Attached SCSI (SAS) protocols, and Fiber Channel SCSI (FCP) protocols, among others. An example of an object-based method is the ANSI T10 OSD protocol. Examples of file-based methods include Network File System (NFS) protocols and Common Internet File Systems (CIFS) protocols, among others.

In some storage networks, a data storage device, such as a hard disk, is associated with a particular server or a particular server having a particular backup server. Thus, access to the data storage device is available only through the server associated with that data storage device. A client processor desiring access to the data storage device would, therefore, access the associated server through the network and the server would access the data storage device as requested by the client.

Alternatively, each data storage system 12 may communicate directly with clients 24, 26 on the network 28, possibly through routers and/or bridges. The data storage systems, clients, managers, etc., may be considered as "nodes" on the network 28. In storage system network 10, no assumption needs to be made about the network topology (as noted hereinbefore) except that each node should be able to contact every other node in the system. The servers (e.g., servers 14, 16, 18, etc.) in the network 28 merely enable and facilitate data transfers between clients and data storage systems, but the servers do not normally implement such transfers.

In one embodiment, the data storage systems 12 themselves support a security model that allows for privacy (i.e., assurance that data cannot be eavesdropped while in flight between a client and a data storage system), authenticity (i.e., assurance of the identity of the sender of a command), and integrity (i.e., assurance that in-flight data cannot be tampered with). This security model may be capability-based. A manager grants a client the right to access the data stored in one or more of the data storage systems by issuing to it a "capability." Thus, a capability is a token that can be granted to a client by a manager and then presented to a data storage system to authorize service. Clients may not create their own capabilities (this can be assured by using known cryptographic techniques), but rather receive them from managers and pass them along to the data storage systems.

A capability is simply a description of allowed operations. A capability may be a set of bits (1's and 0's) placed in a predetermined order. The bit configuration for a capability may specify the operations for which that capability is valid. Thus, there may be a "read capability," a "write capability," a "set-attribute capability," etc. Every command sent to a data storage system may need to be accompanied by a valid capability of the appropriate type. A manager may produce a capability and then digitally sign it using a cryptographic key that is known to both the manager and the appropriate a data storage system, but unknown to the client. The client will submit the capability with its command to the data storage system, which can then verify the signature using its copy of the key, and thereby confirm that the capability came from an authorized manager (one who knows the key) and that it has not been tampered with in flight. A data storage system may itself use cryptographic techniques to confirm the validity of a capability and reject all commands that fail security checks. Thus, capabilities may be cryptographically "sealed" using "keys" known only to one or more of the managers 14, 22 and the data storage systems 12. In one embodiment, only the realm managers 18 may ultimately compute the keys for capabilities and issue the keys to other managers (e.g., the file managers 14) requesting them. A client may return the capability to the manager issuing it or discard the capability when the task associated with that capability is over.

A capability may also contain a field called the Authorization Status (AS), which can be used to revoke or temporarily disable a capability that has been granted to a client. Every object stored on a data storage system may have an associated set of attributes, where the AS is also stored. Some of the major attributes for an object include: (1) a device_id identifying, for example, the data storage system storing that object and the file and storage managers managing that object; (2) an object-group_id identifying the object group containing the object in question; and (3) an object_id containing a unique number generated (e.g., by a storage manager) to identify the object in question. If the AS contained in a capability does not exactly match the AS stored with the object, then the data storage system may reject the access associated with that capability. A capability may be a "single-range" capability that contains a byte range over which it is valid and an expiration time. The client may be typically allowed to use a capability as many times as it likes during the lifetime of the capability. Alternatively, there may be a "valid exactly once" capability.

It is noted that in order to construct a capability (read, write, or any other type), the FM or SM may need to know the value of the AS field (the Authorization Status field) as stored in the object's attributes. If the FM or SM does not have these attributes cached from a previous operation, it will issue a GetAttr ("Get Attributes") command to the necessary data storage system(s) to retrieve the attributes. The data storage systems may, in response, send the attributes to the FM or SM requesting them. The FM or SM may then issue the appropriate capability.

Logically speaking, various system "agents" (i.e., the clients 24, 26, the managers 14, 22 and the data storage systems 12) are independently-operating network entities. Day-to-day services related to individual files and directories are provided by file managers (FM) 14. The file manager 14 may be responsible for all file- and directory-specific states. In this regard, the file manager 14 may create, delete and set attributes on entities (i.e., files or directories) on clients' behalf. When clients want to access other entities on the network 28, the file manager performs the semantic portion of the security work—i.e., authenticating the requester and authorizing the access—and issuing capabilities to the clients. File managers 14 may be configured singly (i.e., having a single point of failure) or in failover configurations (e.g., machine B tracking machine A's state and if machine A fails, then taking over the administration of machine A's responsibilities until machine A is restored to service).

The primary responsibility of a storage manager (SM) 16 is the aggregation of data storage systems 12 for performance and fault tolerance. A system administrator (e.g., a human operator or software) may choose any layout or aggregation scheme for a particular object. The SM 16 may also serve capabilities allowing clients to perform their own I/O to aggregate objects (which allows a direct flow of data between a data storage system 12 and a client). The storage manager 16 may also determine exactly how each object will be laid out—i.e., on what data storage system or systems that object will be stored, whether the object will be mirrored, striped, parity-protected, etc. This distinguishes a "virtual object" from a "physical object". One virtual object (e.g., a file or a directory object) may be spanned over, for example, three physical objects (i.e., multiple data storage systems 12 or multiple data storage devices of a data storage system 12).

The storage access module (SAM) is a program code module that may be compiled into the managers as well as the clients. The SAM generates and sequences the data storage system-level operations necessary to implement system-level I/O operations, for both simple and aggregate objects. A performance manager 22 may run on a server that is separate from the servers for other managers (as shown, for example, in FIG. 1) and may be responsible for monitoring the performance of the data storage realm and for tuning the locations of objects in the system to improve performance. The program codes for managers typically communicate with one another via RPC (Remote Procedure Call) even if all the managers reside on the same node (as, for example, in the configuration in FIG. 2).

A further discussion of various managers shown in FIG. 1 (and FIG. 2) and the interaction among them is provided in the commonly-owned U.S. Pat. No. 6,985,995, whose disclosure is incorporated by reference herein in its entirety.

The installation of the manager and client software to interact with data storage systems 12 and perform object-based data storage in the file system 10 may be called a "realm." The realm may vary in size, and the managers and client software may be designed to scale to the desired installation size (large or small). A realm manager 18 is responsible for all realm-global states. That is, all states that are global to a realm state are tracked by realm managers 18. A realm manager 18 maintains global parameters, notions of what other managers are operating or have failed, and provides support for up/down state transitions for other managers. Realm managers 18 keep such information as realm-wide file system configuration, and the identity of the file manager 14 responsible for the root of the realm's file namespace. A state kept by a realm manager may be replicated across all realm managers in the data storage network 10, and may be retrieved by querying any one of those realm managers 18 at any time. Updates to such a state may only proceed when all realm managers that are currently functional agree. The replication of a realm manager's state across all realm managers allows making realm infrastructure services arbitrarily fault tolerant—i.e., any service can be replicated across multiple machines to avoid downtime due to machine crashes.

The realm manager 18 identifies which managers in a network contain the location information for any particular data set. The realm manager assigns a primary manager (from the group of other managers in the data storage network 10) which is responsible for identifying all such mapping needs for each data set. The realm manager also assigns one or more backup managers (also from the group of other managers in the system) that also track and retain the location information for each data set. Thus, upon failure of a primary manager, the realm manager 18 may instruct the client 24, 26 to find the location data for a data set through a backup manager.

Figure 2:
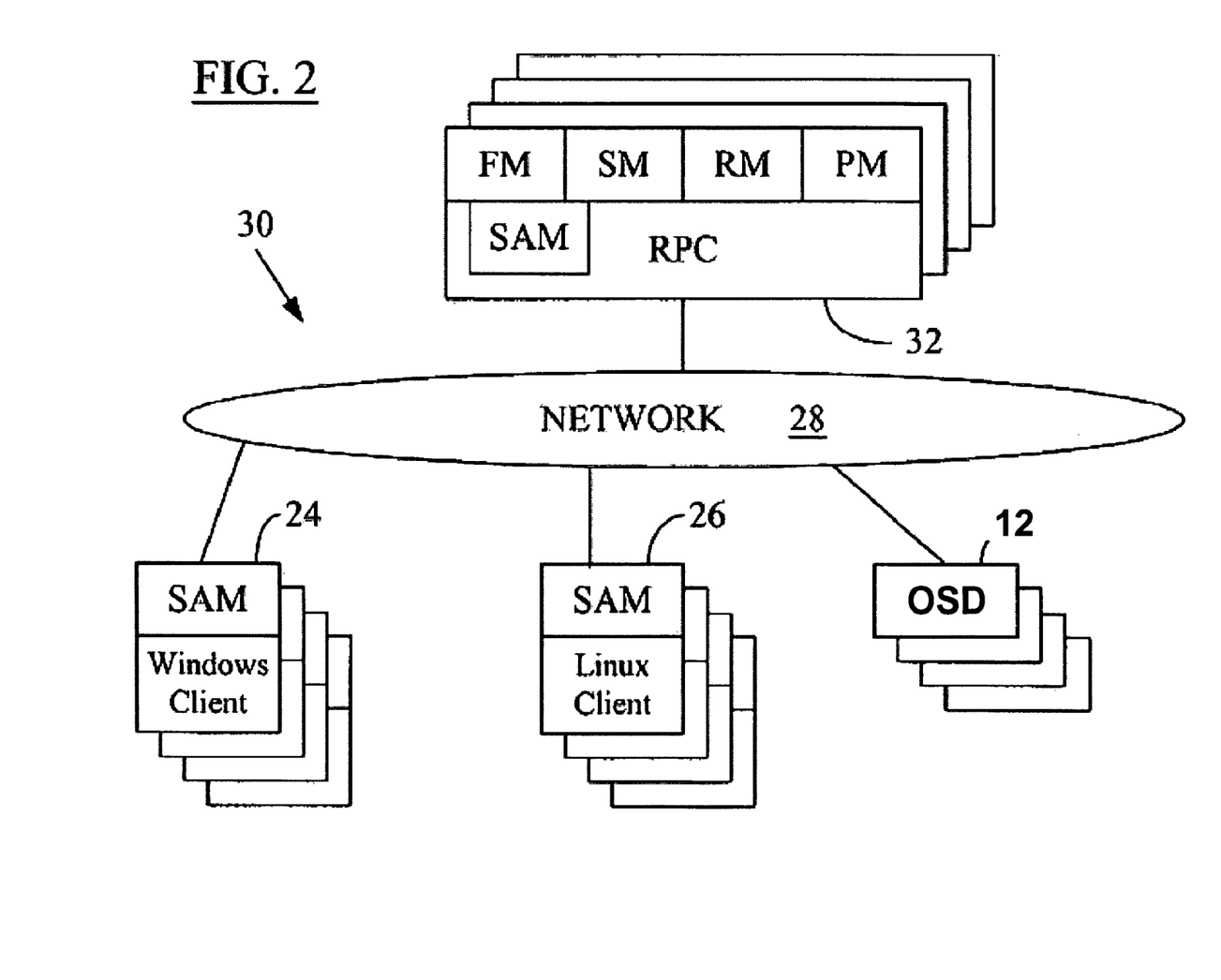
FIG. 2 illustrates another embodiment of a file storage system network.

FIG. 2 illustrates one implementation 30 where various managers shown individually in FIG. 1 are combined in a single binary file 32. FIG. 2 also shows the combined file available on a number of servers 32. In the embodiment shown in FIG. 2, various managers shown individually in FIG. 1 are replaced by a single manager software or executable file that can perform all the functions of each individual file manager, storage manager, etc. It is noted that all the discussion given hereinabove and later hereinbelow with reference to the data storage network 10 in FIG. 1 equally applies to the data storage network 30 illustrated in FIG. 2. Therefore, additional reference to the configuration in FIG. 2 is omitted throughout the discussion, unless necessary.

Generally, the clients may directly read and write data, and may also directly read metadata. The managers, on the other hand, may directly read and write metadata. Metadata may include, for example, file object attributes as well as directory object contents, group inodes, object inodes, and other information. The managers may create other objects in which they can store additional metadata, but these manager-created objects may not be exposed directly to clients.

In some embodiments, clients may directly access data storage systems 12, rather than going through a server, making I/O operations in the object-based data storage networks 10, 30 different from some other file systems. In one embodiment, prior to accessing any data or metadata, a client must obtain (1) the identity of the data storage system(s) 12 on which the data resides and the object number within the data storage system(s), and (2) a capability valid on the data storage systems(s) allowing the access. Clients learn of the location of objects by directly reading and parsing directory objects located on the data storage system(s) identified. Clients obtain capabilities by sending explicit requests to file managers 14. The client includes with each such request its authentication information as provided by the local authentication system. The file manager 14 may perform a number of checks (e.g., whether the client is permitted to access the data storage system, whether the client has previously misbehaved or "abused" the system, etc.) prior to granting capabilities. If the checks are successful, the FM 14 may grant requested capabilities to the client, which can then directly access the data storage system in question or a portion thereof.

Capabilities may have an expiration time, in which case clients are allowed to cache and re-use them as they see fit. Therefore, a client need not request a capability from the file manager for each and every I/O operation. Often, a client may explicitly release a set of capabilities to the file manager (for example, before the capabilities' expiration time) by issuing a Write Done command. There may be certain operations that clients may not be allowed to perform. In those cases, clients simply invoke the command for a restricted operation via an RPC (Remote Procedure Call) to the file manager 14, or sometimes to the storage manager 16, and the responsible manager then issues the requested command to the data storage system in question. Additional details regarding network communications and interactions, commands and responses thereto, among other information, the may be found in U.S. Pat. No. 7,007,047, which incorporated by reference herein in its entirety.

Figure 3:
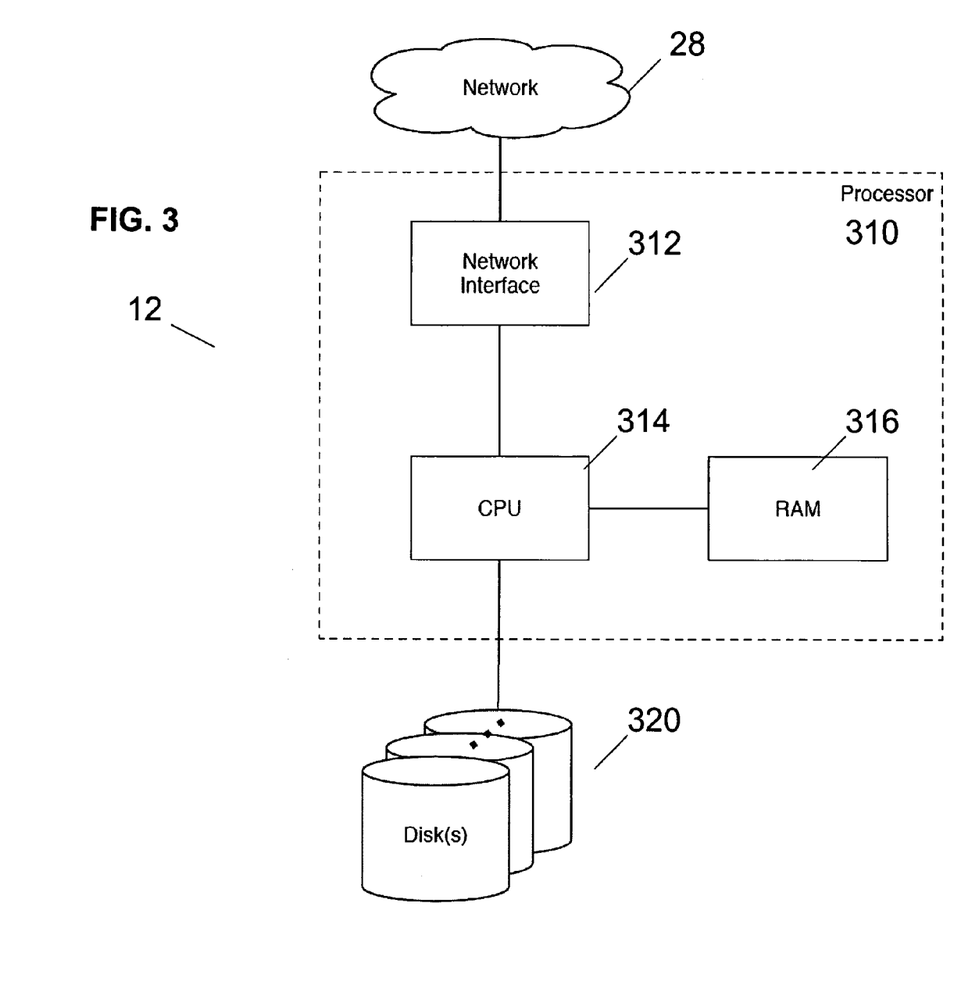
FIG. 3 illustrates a block diagram of an exemplary data storage system.

FIG. 3 illustrates an exemplary embodiment of a data storage system 12. As shown the data storage system 12 includes a processor 310 and one or more storage devices 320. The storage devices 320 may be storage disks that stores data files in the network-based system 10. The storage devices 320 may be, for examples, hard drives, optical or magnetic disks, or other storage media, or combination of media. The processor 310 may be any type of processor, and may comprise multiple chips or a single system on a chip. If the data storage system 12 is utilized in a network environment, such as coupled to network 28, the processor 310 may be provided with network communications capabilities. For example, processor 310 may include a network interface 312, a CPU 314 with working memory, e.g., RAM 316. The processor 310 may also include ROM and/or other chips with specific applications or programmable applications. As discussed further below, the processor 310 manages data storage in the storage device(s) 320. The processor 310 may operate according to program code written in C, C++, or in any other compiled or interpreted language suitably selected. The software modules may be designed using standard software tools including, for example, compilers, linkers, assemblers, loaders, bug tracking systems, memory debugging systems, etc.

As noted, the processor 310 manages data storage in the storage devices. In this regard, it may execute routines to received data and write that data to the storage devices and to read data from the storage devices and output that data to the network or other destination. The processor 310 also perform other storage-related functions, such as providing data regarding storage usage and availability, and creating, storing, updating and deleting meta-data related to storage usage and organization, and managing data security.

The storage device(s) 320 may be divided into a plurality of blocks for storing data for a plurality of volumes. For example, the blocks may correspond to sectors of the data storage device(s) 320, such as sectors of one or more storage disks. The volumes may correspond to blocks of the data storage devices directly or indirectly. For example, the volumes may correspond to groups of blocks or a Logical Unit Number (LUN) in a block-based system, to object groups or object partitions of an object-based system, or files or file partitions of a file-based system. The processor 310 manages data storage in the storage devices 320. The processor may, for example, allocate a volume, modify a volume, or delete a volume. Data may be stored in the data storage system 12 according to one of several protocols.

All volumes are assigned their own unique identification code. This may be an operation of the processor 310 responsive to a command to allocate a volume. For example, the identification code may be a 32-bit or 64-bit integer. All subsequent snapshots are also assigned their own unique identification code. The snapshot identification code may be the same size as the volume identification code. According to some embodiments, the same identification code scheme may be applied to for both volumes and snapshots. A snapshot may be regarded as a type of volume. Moreover, according to one implementation, taking a snapshot of a snapshot is not permitted. As a result, the processor 310 can maintain a snapshot link chain in temporal order. Further, the processor 310 may maintain the block map data structure including a pair of code identifications or boundary values indicative of a range, rather than a counter. The range may encompass a start_id and an end_id pair representing an order of volumes, where the volumes are those in which a particular group of one or more blocks were allocated. In this regard, the relevant order of volumes may be represented as a volume/snapshot link chain. The start_id may be the oldest volume or snapshot in which the block was allocated, and the end_id may be the newest volume or snapshot in which the block was allocated. As volumes are allocated, modified, and deleted, and as snapshots are taken and deleted, the processor 310 may update the data entries stored in the block map.

The following simple examples illustrate modification of the block map using the format [start_id:end_id] as the processor 310 manages data storage within the data storage devices 320.

(1) Processor 310 allocates a block in volume id 1, setting the block map value to [1:1].

(2) Processor 310 takes a snapshot of volume id 1, thereby creating a snapshot id=2. The snapshot chain is 1->2 and the block map value is [2:1].

(3) Processor 310 takes another snapshot of volume id 1, thereby creating snapshot id=3. The snapshot chain is 1->3->2 and the block map value remains [2:1].

(4) Processor 310 deletes snapshot id 2. The snapshot chain is 1->3 and the block map value becomes [3:1].

(5) Processor 310 next frees block from volume id 1. The block map value becomes [3:3]. This is because the snapshot id 3 has not been freed.

(6) Processor 310 deletes snapshot id 3. The block map value becomes [0:0], connoting that the block is free.

However, it should be appreciated that the order of volumes and/or snapshots may be defined in several different ways, thereby yielding different end point values, or the pair of values tracked by the block map may be defined different ways to achieve the same objective. However, consistent with the different embodiments, the operation of the processor 310 in maintaining the block map may advantageously allow for multiple volume/snapshot create and delete instances to be coalesced, thereby saving time and improving efficiency. For example, consider a case where volume 10 and volume 20 both exist as independent volumes (i.e., not part of the other's snapshot chain), and the processor 310 is instructed to create a snapshot id 11 of volume 10 and a snapshot id 21 of volume 20, thus resulting in the two snapshot chains 10->11 and 20->21, and requiring changes to the block map for entries that reference volume id 10 and volume id 20. In this situation the processor 310 may coalesce these operations and perform a single update pass over the block map to perform both sets of updates. Therefore, the processor 310 may take or delete a snapshot on independent chains concurrently, and combine their updates in a single pass over the block map. This coalescing may be done for all snapshot operations occurring within a predetermined period of time, or for snapshot operations that are received prior to another snapshot operation that cannot be coalesced with the prior operations. The predetermined period of time may be, for example, 15 seconds, 30 seconds, 45 seconds, 1 minute, or another time.

The processor 310 may respond to a query regarding the amount of space that would be freed if one or more snapshots were deleted, resolving the query in a single pass over the block map. The result of this query is the number of blocks in the block map that are solely addressed by the snapshot or portion of the snapshot chain specified by the operation. Moreover, using the format for the block map described above, a counter may be kept in each volume/snapshot of how much space it uniquely addresses. This value for a volume with identifier N is the number of blocks in the block map whose reference value is [N:N] (i.e., the number of blocks that are solely addressed by this volume). This value may be cached by storing it in the inode for the volume or the snapshot, so that the answer to such queries can be obtained more quickly than the amount of time required to perform a pass over the block map. Operations which modify the block map would also update the corresponding counters in each affected volume or snapshot inode.

Figure 4:
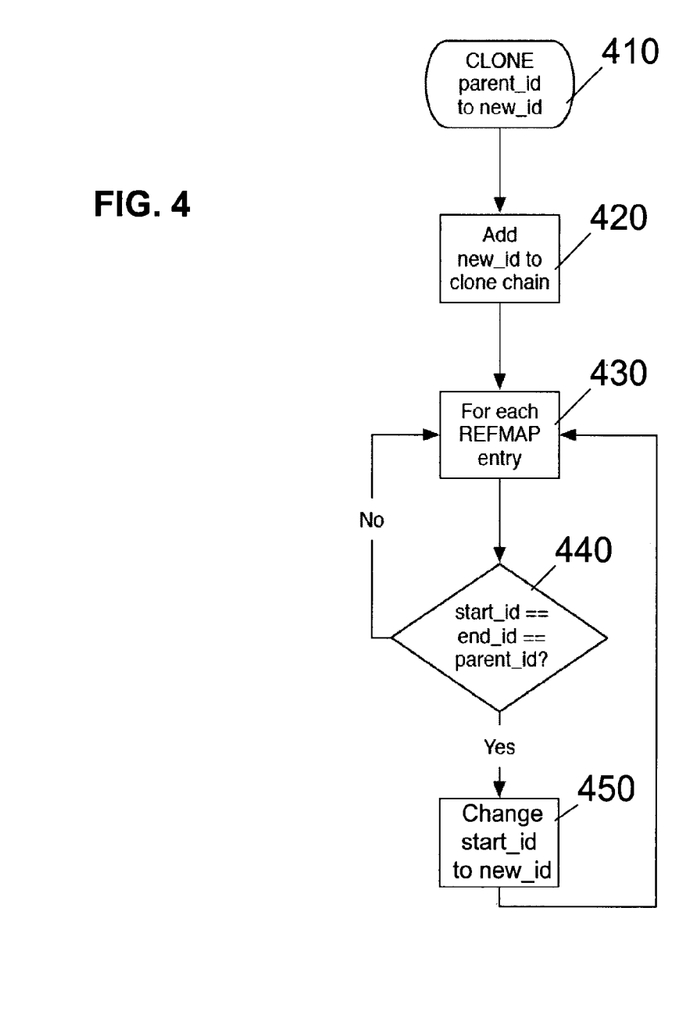
FIG. 4 provides a flow chart of an example of steps performed in managing the block map when creating a snapshot.

FIG. 4 provides a flow chart of an example of steps the processor 310 performs in managing the block map when creating a snapshot. The process is simplified for purposes of clarity. In this example, the snapshot is taken of a volume identified by parent_id. The snapshot is assigned new_id for identification. As shown at 410, the processor 310 clones the parent_id to a new_id. At step 420, the processor 310 adds the new_id to the snapshot or clone link chain. This may be done in several different ways depending, for example, on how the link chain is maintained. According to some embodiments, the link chain may be maintained in the gnodes. Of course, the snapshot link chain may be stored in other locations.

At step 430, the processor 310 begins a loop in which each block map entry in the block map is referenced. At step 440, the processor 310 compares the values in a block map entry, e.g., the start_id and the end_id, to the parent_id. If the start_id and the end_id equal the parent_id, then, at step 450, the start_id is changed to new_id. Thus, in the present example, when start_id and end_id are both the same as parent_id, no prior snapshot of parent_id exists. Consequently, new_id represents a start of the snapshot chain, and it is recorded in the block map.

If at step 440 the start_id and the end_id do not equal the parent_id, then the processor 310 steps to the next block map entry in the block map. The block map update represents everything that has changed since the previous snapshot was taken. That can only be things which have a block map value of [parent_id:parent_id], since anything which does not have that value is either unchanged since the previous snapshot or not part of the snapshot being taken. As a result, new_id is not recorded in the block map. Steps 430, 440 and 450 are repeated until the processor 310 has stepped through each of the entries of the block map.

Figure 5:
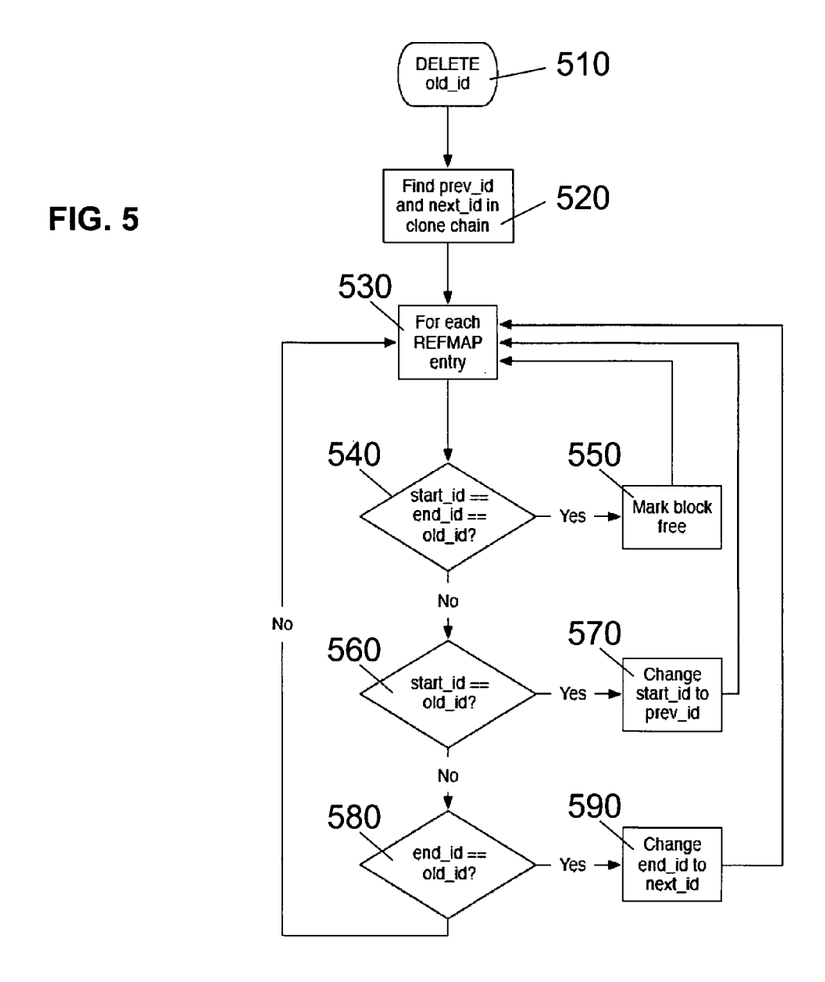
FIG. 5 provides a flow chart of an example of steps performed in managing the block map when deleting a snapshot or volume.

FIG. 5 provides a flow chart of an example of steps the processor 310 performs in managing with the block map when deleting a snapshot or volume. In this example, the snapshot or volume to be deleted has the identification number old_id. The volume or snapshot, if any, that is next in the snapshot chain relative to old_id has the identification number next_id, and the volume or snapshot, if any, previous to old_id in the snapshot chain has the identification number prev_id. At step 510, the processor 310 initiates the delete process for old_id. At step 520, the processor 310 identifies prev_id, if any, and next_id, if any.

At step 530, the processor 310 begins a loop in which each block map entry in the block map is referenced. At step 540, the processor 310 compares the values in the block map entry, e.g., start_id and end_id, to old_id. If start_id and end_id equal old_id, then, at step 550, the processor 310 marks the block or group of blocks corresponding to old_id as free. This may be done, for example, by setting start_id and end_id to zero. In this example, start_id and end_id both equal old_id when no other snapshot or volume references the group of blocks corresponding to old_id. Accordingly, the processor 310 can free these block(s).

If the processor 310 determines at step 540 that both start_id and end_id do not equal old_id, the processor 310 transitions to step 560. At step 560, the processor 310 determines whether start_id equals old_id. If so, the processor 310 changes start_id to prev_id, as indicated at step 570. In effect, the processor 310 determines that old_id is the oldest snapshot corresponding to the group of blocks. As a consequence, when this oldest snapshot is deleted, the next oldest snapshot or the original volume should be identified by the start_id. Step 570 accomplishes this.

If processor 310 determines at step 560 that start_id does not equal old_id, then the process transitions to step 580. At step 580, the processor 310 determines whether end_id equals old_id. If so, at step 590, the end_id is changed to next_id. In effect, the processor 310 determined that old_id is the original volume or most recent snapshot. Step 590 changes the end_id of the block map to the id corresponding the next most recent snapshot.

If at step 580, end_id does not equal the old_id, then the processor 310 steps to the next block map entry. Steps 530 through 590 are repeated until the processor 310 has stepped through all of the block map entries in the block map. This ensures that all of the block map entries that should be updated are in fact updated. Only the bock map entries that are involved in a create snapshot or delete snapshot/volume are changed. Moreover, while FIGS. 4 and 5 provide a simple example of how the block map is managed when a snapshot is taken and when a snapshot/volume is deleted, it should be appreciated that the operations can be used together to permit a multiple snapshot to be taken and multiple snapshots/volumes to be deleted in a single walk through the block map.

As noted above, the data storage system 12 may be implemented using an object-based storage protocol in a data storage network. For example, the data storage system 12 may have the following properties: (1) it presents an object-oriented interface rather than a sector-based interface (wherein each "block" on a disk contains a number of data "sectors") as is available with traditional magnetic or optical data storage disks (e.g., a typical computer hard drive); (2) it attaches to a network (e.g., the network 28) rather than to a data bus or a backplane (i.e., the data storage systems 12 may be considered as first-class network citizens); and (3) it enforces a security model to prevent unauthorized access to data stored thereon.

When implemented as an object-based data storage system, the fundamental abstraction exported by a data storage device 12 may be an "object," which may be defined as a variably-sized ordered collection of bits. Unlike some non-object based storage systems, an object-based implementation does not export a sector interface (which guides the storage disk head to read or write a particular sector on the disk) during normal operation. Objects of an object-based system can be created, removed, written, read, appended to, etc. In one embodiment, each data file and each file directory in the data storage network 10 are stored using one or more objects of object-based data storage systems. However, it should be appreciated that non object-based storage disks may be utilized.

Figure 6:
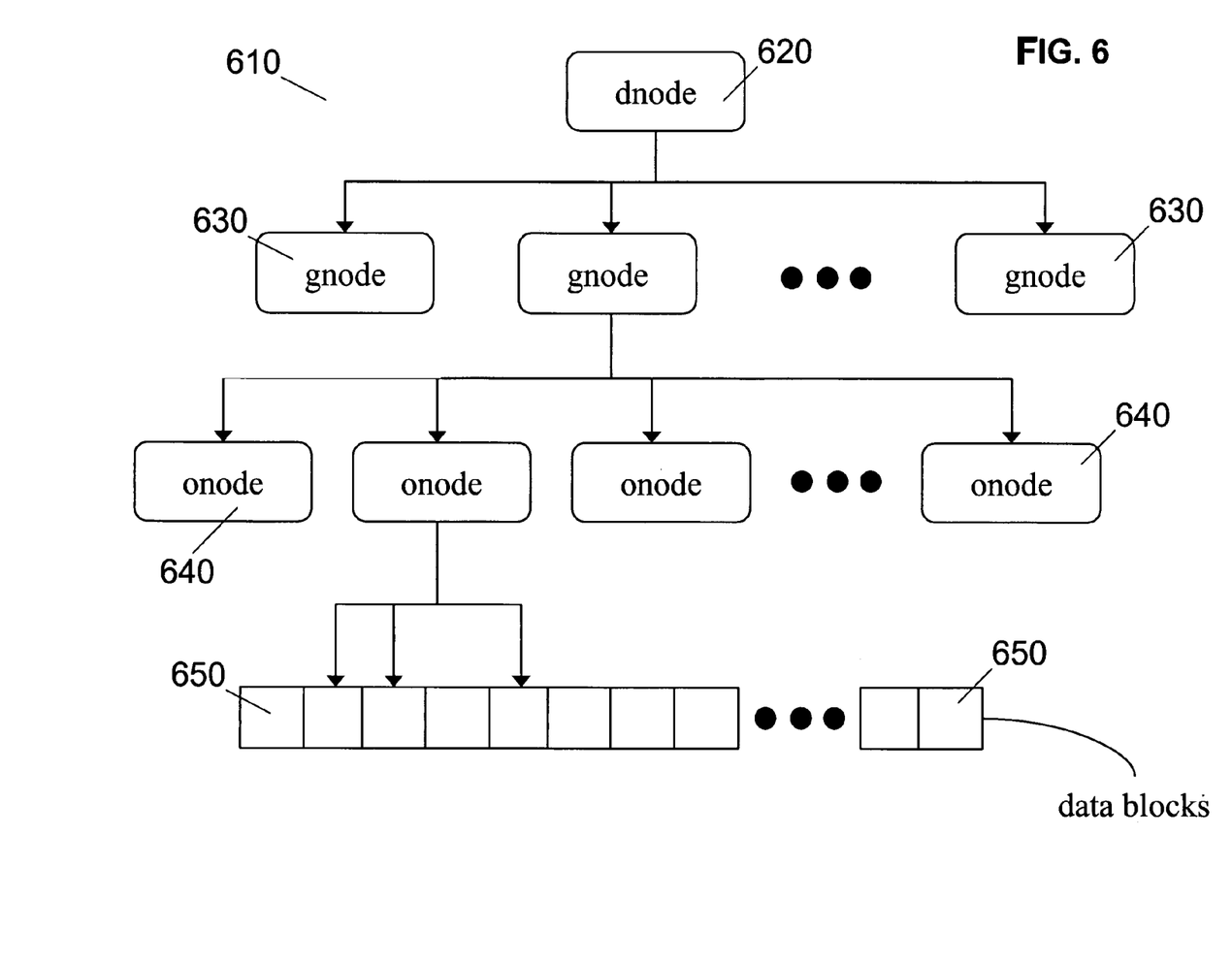
FIG. 6 illustrates a sample OSD object hierarchy.

FIG. 6 illustrates further examples of the operation of the block map in connection with a sample OSD object hierarchy 610. The object hierarchy 610 represents relationships between and organization of the data stored in the storage device(s) 320 of the data storage system 12. As noted, the individual elements of the object hierarchy 610 can be created, stored, updated and modified, and deleted by the processor 310 in accordance with the data stored in the data storage system. However, it should be understood that the object hierarchy is a virtual representation of the data stored in the data storage device.

The elements of the object hierarchy include inodes of one or more types. The inodes may be data structures that contain information about the data blocks of the storage device(s) 320. The data blocks may represent physical locations on the storage device(s) 320 where data is or may be stored. Each of the inodes may assigned a unique id number by the processor 310 or other system or network element. The inodes may contain various information, such as security permissions, user information, dates of creation and modification, and block pointers, as described below. In the example of FIG. 6, the elements of the object hierarchy 610 include a disk inode (dnode) 620, group inodes (gnode) 630, object inodes (onodes), 640 and data blocks 650. One dnode 620 references zero or more gnodes 630. Each gnode 630 reference zero or more onodes 640. Each onode 640 references zero or more data blocks. The various inodes may reference the other inodes using pointers based on their i-number.

Figure 7:
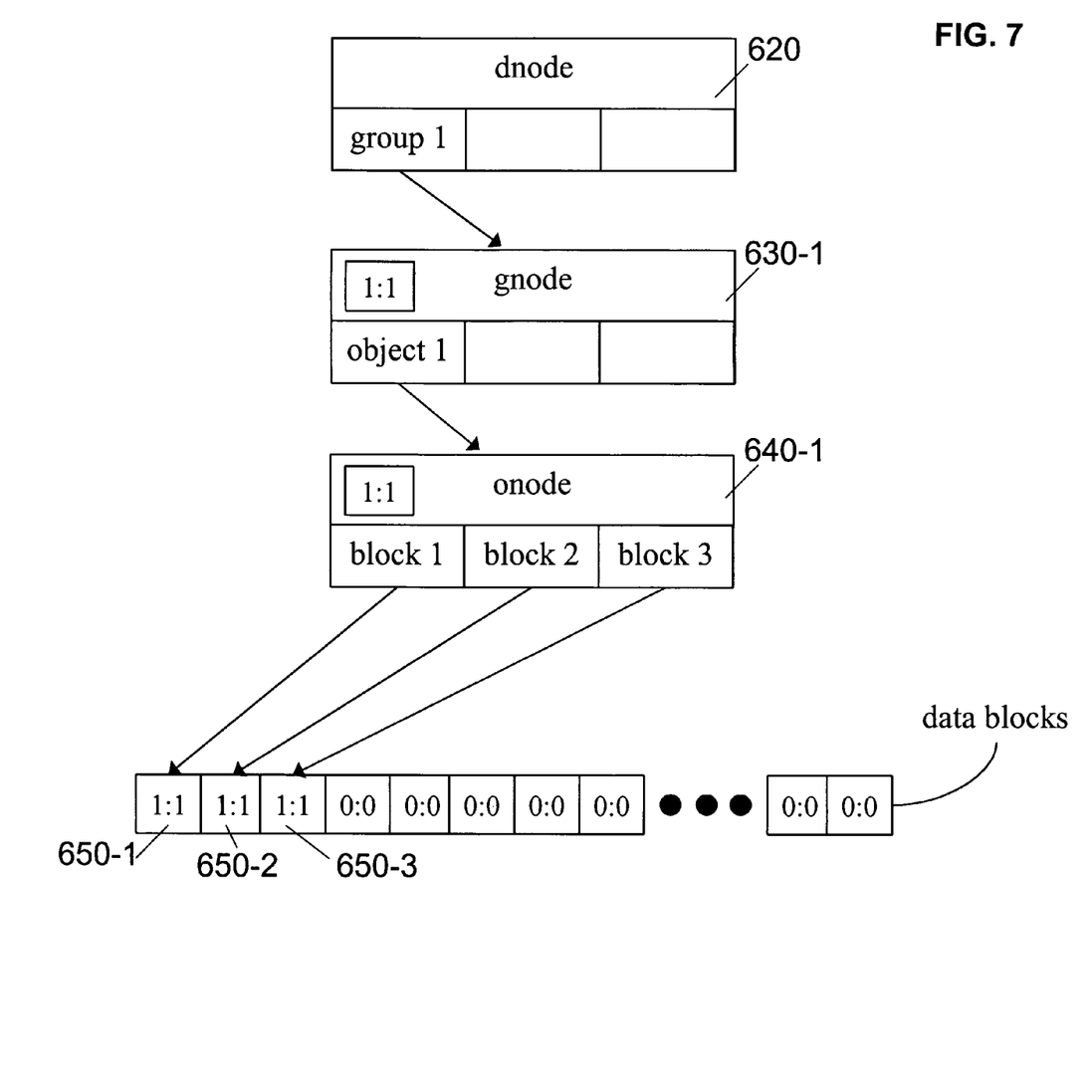
FIG. 7 illustrates an example of the block map entries for the blocks that represent a subset of the tree for a single object.

FIG. 7 illustrates the block map entries for the blocks that represent a subset of the tree for a single object. The block map may be stored in the storage device as a virtual object having an onode, but which is not addressable externally of the data storage system. The tree may be stored in gidmap and oidmap data structures pointed to by the dnode and gnodes, respectively. However, it should be understood that the block map and tree could be stored elsewhere, such as a separate storage device or in memory associated with the processor 310, using other data structures. As shown in FIG. 7, the dnode 620 references group 1, corresponding to gnode 630-1. In this case, gnode 630-1 is assigned a unique identification number, "1" in this simple example. The gnode 630-1, therefore, has a block map entry of [1:1]. The gnode 630-1 references object 1, corresponding to onode 640-1. The onode 640-1 as a block map entry of [1:1]. The onode 640-1 references data blocks 650-1, 650-2, and 650-3 of data blocks 550. In this example, each of blocks 650-1 to 650-3 have a block map entry [1:1] indicating that they are owned solely by group 1.

Figure 8:
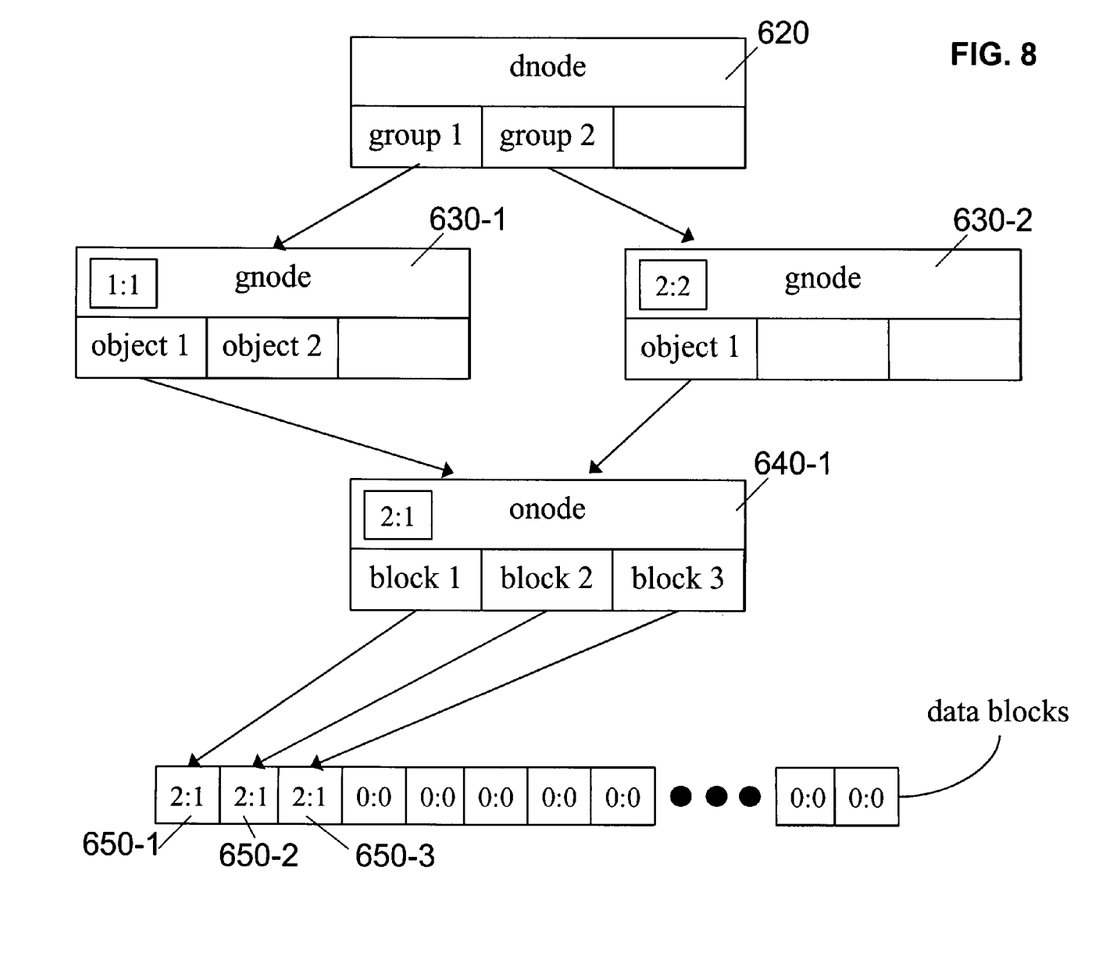
FIG. 8 illustrates an example of the block map entries and object structure after group 2 is created as a snapshot of group 1.

FIG. 8 illustrates the block map entries and object structure after group 2 is created as a snapshot of group 1. In this case, dnode 620 references group 2, corresponding to gnode 630-2. In this case, gnode 630-2 is assigned a unique identification number, "2" in this simple example. The gnode 630-2, therefore, has a block map entry of [2:2]. Because group 2 is a snapshot of group 1, gnode 630-2 references object 1, i.e., onode 640-1. As above, onode 640-1 references data blocks 650-1, 650-2, and 650-3. Thus, it should be noted that each of group 1 and 2 has its own gnode, but the onode for "object 1" and all of its data blocks are shared by the two groups. The block map entry values for onode 640-1 become [2:1]. The same is true for data blocks 650-1, 650-2, and 650-3.

Figure 9:
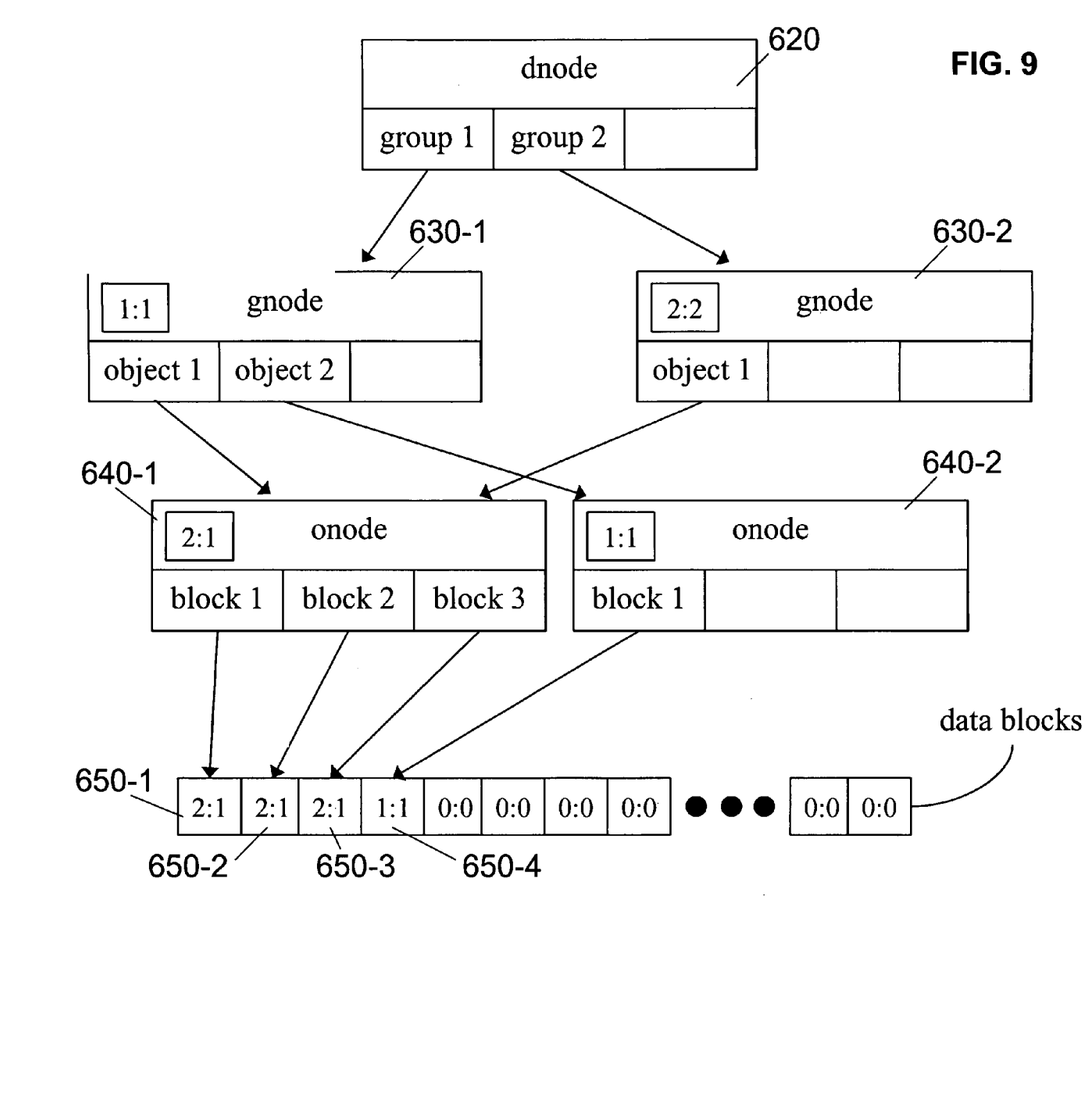
FIG. 9 illustrates an example of the block map entries and object structure from FIG. 3 after group 1 is modified by creating a new object ("object 2").

FIG. 9 illustrates the block map entries and object structure from FIG. 8 after group 1 is modified by creating a new object 2. Consequently, gnode 630-1 references onode 640-1 and onode 640-2, which corresponds to object 2. The block map entry for onode 640-2 is [1:1] because it is referenced only by group 1. The onode 640-2 references block 650-4. Note that object 1 is still shared by both groups 1 and 2, and has block map entry [2:1], but object 2 is only referenced by group 1 and thus has the block map entry [1:1].

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

We claim:

1. A data storage system comprising:
  a storage device, the storage device divided into a plurality of blocks configured for storing data for a plurality of volumes organized in a hierarchy comprising object inodes and group inodes, wherein each object inode references those blocks which store data corresponding to that object inode and wherein each group inode references those object inodes corresponding to that group inode; and a processor configured to execute instructions for maintaining a block map corresponding to the data stored on the storage device, wherein the block map stores reference data indicating which of the blocks on the storage device are allocated to one or more of the group inodes, and which blocks on the storage device are unallocated, and wherein the reference data includes, for groups of one or more blocks, a pair of boundary values representing end points in an order of the group inodes to which the group of blocks were allocated, the group inodes including but not limited to snapshots.

2. The data storage system according to claim 1, wherein the pair of boundary values comprise a first value identifying an oldest group inode to which the group of blocks was allocated and a second value identifying a newest group inode to which the group of blocks was allocated.

3. The data storage system according to claim 2, wherein the reference data includes the first and the second values for each of the plurality of blocks.

4. The data storage system according to claim 2, wherein the processor further deletes one of the volumes and updates the reference data corresponding to the group of blocks referenced by the deleted volume, including revising the first value if the first value identifies the deleted volume, and revising the second value if the second value identifies the deleted volume.

5. A data storage system comprising:

a storage device, the storage device divided into a plurality of blocks configured for storing data for a plurality of volumes organized in a hierarchy comprising object inodes and group inodes, the group inodes including snapshots, wherein each object inode references those of the blocks which store data corresponding to that object inode and wherein each group inode references those of the object inodes corresponding to that group inode; and one or more processors configured to execute instructions for implementing an object-based data storage system and for maintaining a block map corresponding to the data stored on the storage device;

wherein the block map stores reference data indicating which of the blocks on the storage device are allocated to one or more of the group inodes, and which blocks on the storage device are unallocated, wherein the reference data includes, for groups of one or more blocks, a pair of boundary values representing end points in an order of the group inodes to which the group of blocks were allocated, wherein the pair of boundary values comprise a first value identifying an oldest group inode to which the group of blocks was allocated and a second value identifying a newest group inode to which the group of blocks was allocated; and wherein the reference data includes the first and the second values for each group of blocks.

6. The data storage system according to claim 5, wherein the reference data includes file system meta-data.

7. The data storage system according to claim 5, wherein the processor maintains an identification of a temporal order in which the group inodes are allocated.

8. A data storage system comprising:

a storage device, the storage device divided into a plurality of blocks configured for storing data for a plurality of volumes, wherein the volumes are organized in a hierarchy comprising object inodes and group inodes, wherein each object inode references those of the blocks which store data corresponding to that object inode, and each group inode references those of the object inodes corresponding to that group inodes; and a processor configured to execute instructions for maintaining a block map corresponding to the data stored on the storage device, wherein the block map stores reference data indicating which of the blocks on the storage device are allocated to one or more of the volumes, and which blocks on the storage device are unallocated, and wherein the reference data includes, for groups of one or more blocks, a pair of boundary values representing end points in an order of the volumes in which the group of blocks were allocated, the pair of boundary values comprising a first value identifying an oldest volume in which the group of blocks was allocated and a second value identifying a newest volume in which the group of blocks was allocated, and wherein, in a single pass through the block map, the data storage processor further deletes multiple of the volumes, and updates the reference data corresponding to each of the one or more groups of blocks referenced by the deleted volumes, including revising the first value if one of the deleted volumes corresponds to the first value, and revising the second value if one of the deleted volumes corresponds to the second value.

9. The data storage system according to claim 8, wherein the volumes identified by the first and second values comprise group inodes.

10. The data storage system according to claim 8, wherein the reference data includes object data.

11. The data storage system according to claim 8, wherein the group inodes comprise snapshots.

12. The data storage system according to claim 11, wherein the order of volumes comprises an order of group inodes.

13. A data storage network comprising:

one or more managers, each of which performs one or more storage management, file management and realm management tasks;

network communication equipment configured for enabling the one or more managers to communicate through a network; and a plurality of data storage systems, each data storage system comprising a storage device and a processor;

at least one of the data storage systems comprising a processor and a storage device divided into a plurality of blocks configured for storing data for a plurality of volumes, the volumes being organized in a hierarchy comprising object inodes and group inodes, wherein each object inode references those of the blocks which store data corresponding to that object inode, and each group inode references those of the object inodes corresponding to that group inodes, wherein the processor is configured for executing instructions for maintaining a block map corresponding to the data stored on the storage device, wherein the block map stores reference data indicating which of the blocks on the storage device are allocated to one or more of the volumes, and which blocks on the storage device are unallocated, and wherein the reference data includes, for groups of one or more blocks, a pair of boundary values representing end points in an order of the volumes in which the group of blocks were allocated, the pair of boundary values comprising a first value identifying an oldest volume in which the group of blocks was allocated and a second value identifying a newest volume in which the group of blocks was allocated; and wherein, in a single pass through the block map, the processor further deletes multiple of the volumes, and updates the reference data corresponding to each of the one or more groups of blocks referenced by the deleted volumes, including revising the first value if one of the deleted volumes corresponds to the first value, and revising the second value if one of the deleted volumes corresponds to the second value.

14. The data storage network according to claim 13, wherein the group inodes including but not limited to snapshots.

15. The data storage network according to claim 14, wherein the storage systems are object-based storage systems, and wherein the first value identifies an oldest group inode to which the group of blocks was allocated and the second value identifies a newest group inode to which the group of blocks was allocated.

16. The data storage network according to claim 13, wherein the one or more managers comprise a storage manager, a file manager, and a realm manager.

17. A method of operating a processor in a data storage system having a storage device, the storage device divided into a plurality of blocks for storing data for a plurality of volumes organized in a hierarchy comprising object inodes and group inodes, wherein each object inode references those blocks which store data corresponding to that object inode and wherein each group inode references those object inodes corresponding to that group inode, the method comprising:
   storing a block map corresponding to the data stored on the storage device, wherein the block map stores reference data indicating which of the blocks on the storage device are allocated to one or more of the group inodes, and which blocks on the storage device are unallocated, and wherein the reference data includes, for groups of one or more blocks, a pair of boundary values representing end points in an order of the group inodes to which the group of blocks were allocated, the group inodes including but not limited to snapshots.

18. The method according to claim 17, the pair of boundary values comprise, a first value identifying an oldest group inodes to which the group of blocks was allocated and a second value identifying a newest group inodes to which the group of blocks was allocated.

19. The method of claim 17, further comprising:
   assigning each volume a unique identification.

20. The method of claim 17, wherein the order of volumes for at least one of the groups of blocks comprises at least one group inode that is a snapshot and at least one group inode that is not a snapshot.

21. The method of claim 18, further comprising:
   generating a new group inode that is a snapshot of at least one of the object inodes; and
   updating the reference data for the groups of one or more blocks that are referenced by the at least one object inode, including updating the second value for each of the groups of one or more blocks if the new group inode is the newest group inode to which the group of blocks was allocated.

22. The method of claim 18, further comprising:
   deleting one of the group inodes; and
   updating the reference data corresponding to the group of blocks referenced by the deleted group inode, including revising the first value if the first value identifies the deleted group inode, and revising the second value if the second value identifies the deleted group inode.

23. The method of claim 18, further comprising:
   deleting multiple of the group inodes; and
   in a single walk through the block map, updating the reference data corresponding to each of the one or more groups of blocks referenced by the deleted group inodes, including revising the first value if one of the deleted group inodes corresponds to the first value, and revising the second value if one of the deleted group inodes corresponds to the second value.

* * * * *